March 31, 1931.  E. ROSER  1,798,500
ROTARY KILN
Filed Sept. 2, 1921　　4 Sheets-Sheet 1
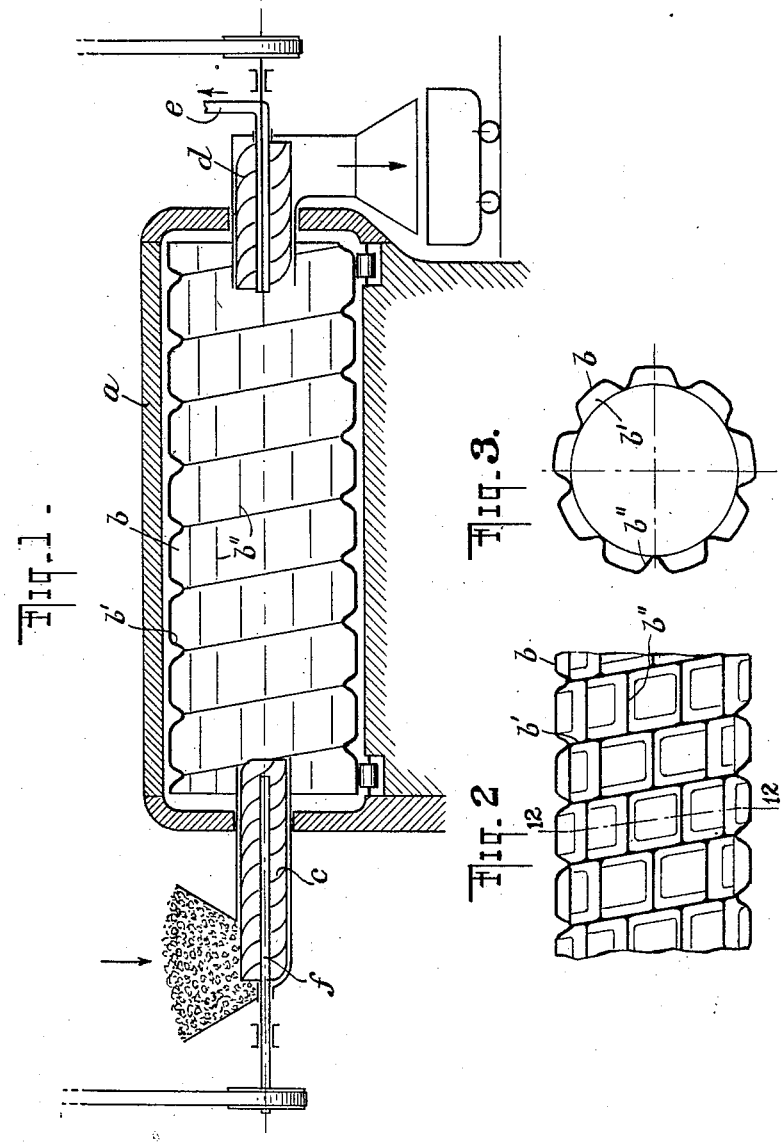
WITNESS:
G. V. Rasmussen
INVENTOR
EDMUND ROSER
BY
Briesen Schrenk
ATTORNEYS March 31, 1931. E. ROSER 1,798,500
ROTARY KILN
Filed Sept. 2, 1921 4 Sheets-Sheet 2
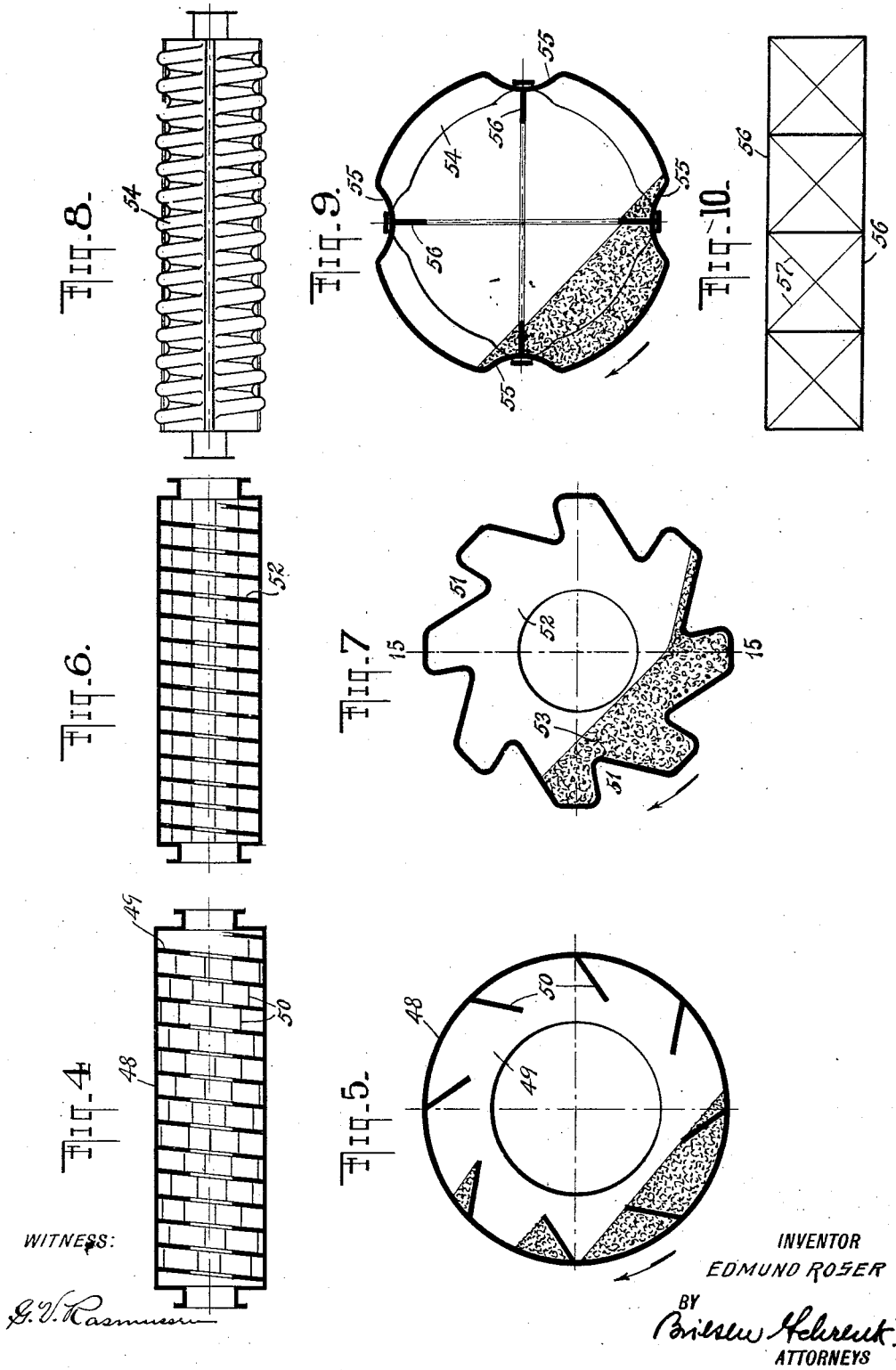
WITNESS:
INVENTOR
EDMUND ROSER
BY
ATTORNEYS

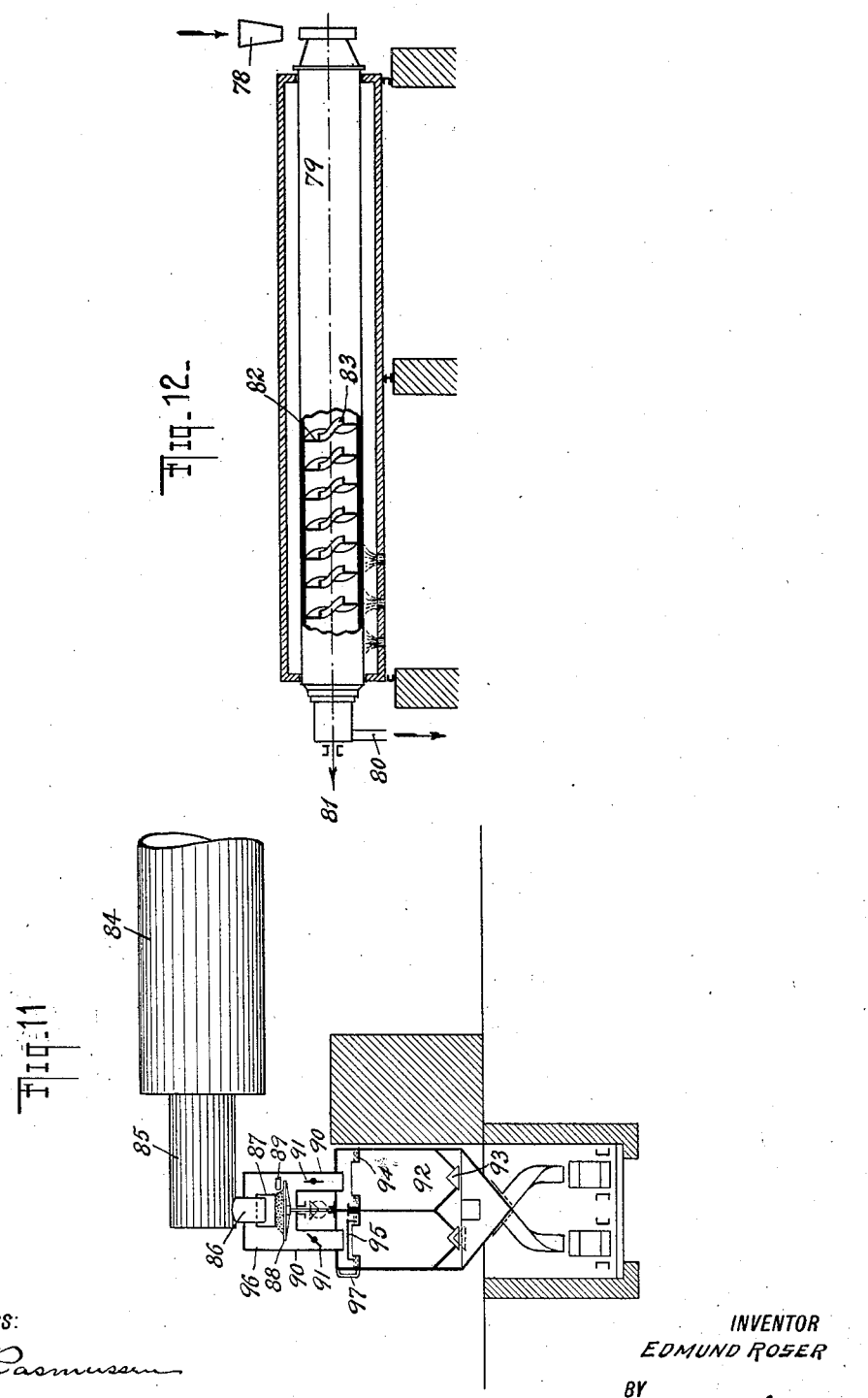

March 31, 1931.  E. ROSER  1,798,500
ROTARY KILN
Filed Sept. 2, 1921  4 Sheets-Sheet 4
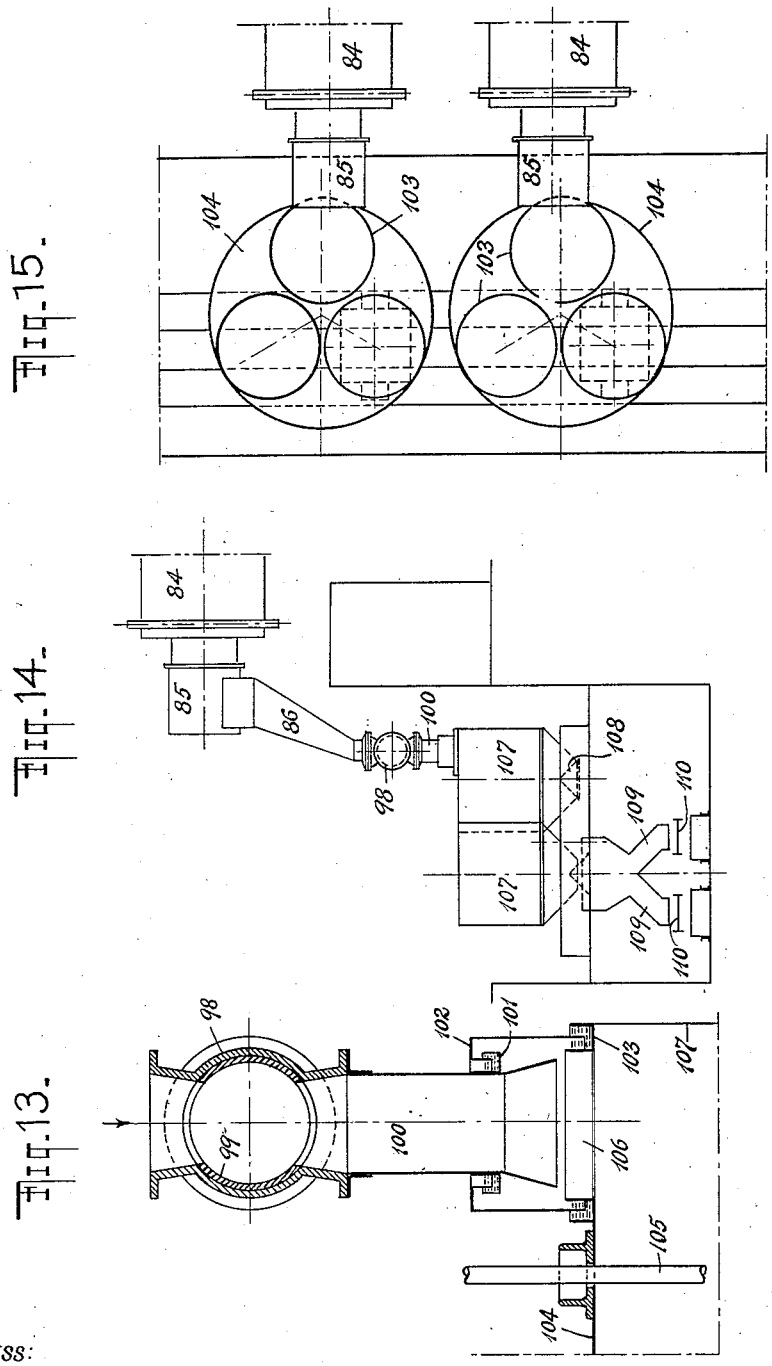
WITNESS:
INVENTOR
EDMUND ROSER
BY
ATTORNEYS Patented Mar. 31, 1931

1,798,500

UNITED STATES PATENT OFFICE

EDMUND ROSER, OF MULHEIM-RUHR, GERMANY, ASSIGNOR, BY MESNE ASSIGNMENTS, TO C. H. ELLSWORTH

ROTARY KILN

Application filed September 2, 1921, Serial No. 498,010, and in Germany February 1, 1919.

Applications for patents have been filed in Germany, February 1, 1919, June 17, 1919, December 20, 1919, December 31, 1919, January 2, 1920, and September 18, 1920; Hungary, September 24, 1920 and September 25, 1920, and in the Netherlands, July 26, 1920.

My invention relates to apparatus for treating bitumen-bearing substances and to obtain from them, at a relatively low temperature, tar which has certain valuable characteristics due to such low temperature, as well as a gas of considerable heating value, and a low temperature residue or sub-coke which is readily utilizable as a solid fuel. The new apparatus comprises a rotary kiln of special construction to enable the low temperature operation to be carried out efficiently.

Various forms of apparatus suitable for the purposes of my invention are illustrated in the accompanying drawings in which—

Fig. 1 is a longitudinal section of one form of rotary kiln embodying my invention; Fig. 2 is a partial longitudinal section of such rotary kiln; Fig. 3 is a cross-section on line 12—12 of Fig. 2; Fig. 4 is a longitudinal section showing another form of rotary kiln; Fig. 5 is a cross-section thereof; Fig. 6 is a longitudinal section of still another form of rotary kiln taken on the line 15—15 of Fig. 7, the latter being a cross-section thereof; Fig. 8 is a side elevation of another form of rotary kiln; Fig. 9 is a cross-section thereof; Fig. 10 is a detail view of an internal framework used in connection with such kiln; Fig. 11 is a vertical section showing a mechanism for the discharge of the low temperature coke from the rotary kiln; Fig. 12 is a longitudinal section of another form of my improved apparatus; Fig. 13 is a side elevation of another form of device for discharging the low temperature coke; Fig. 14 is an end elevation with parts in section, and Fig. 15 is a corresponding plan view.

My improved apparatus comprises a rotary shell or kiln the outer surface of which is heated in any suitable manner and which is provided at one end with means for introducing the coal or other material to be treated while the solid residue or sub-coke is withdrawn at the other end of the rotary kiln. The coal or other bitumen-bearing material is subjected within the kiln to distillation at a temperature far below that customarily employed in the production of coke. The heat expels certain gases from the bituminous material, but owing to the low temperature employed, there is little danger of a decomposition of the gases thus driven off. I have found that a temperature of 500° C. is about the maximum to which the material within the rotary kiln should be subjected if undesirable decompositions of the gaseous products are to be avoided. Certain gases, such as methane, and also the vapors of the light oils, are liberated chiefly near the charging and where the temperature is relatively low. These gases, as described, reach the central portion of the kiln and are therefore not in contact with the heated wall of the kiln, or at least, not with the hottest portions of said wall which, as stated above, are at the bottom of the kiln. In some cases the decomposition of these gases and loss may be prevented by blowing a small amount of steam or other inert gases into the rotary kilns preferably at the charging end thereof so as to impart a higher velocity to the gases liberated in the kiln and carry them quickly through the hottest zone of the kiln to the relatively cool discharge end. These gases and oils therefore remain but a short time within the zone in which there is danger of decomposition. The amount of steam required is very small, being about 70 kilograms of steam per hour for the treatment of two tons of coal per hour. The steam particles also exert a beneficial action by enveloping the methane and heavy hydrocarbons formed and thus protecting them, as well as the ammonia molecules, against cracking or decomposition. An instance of apparatus and means for the injection of steam or other inert gases is shown in Fig. 1. $a$ indicates the setting within which rotates the kiln $b$, heated in its entire length by gases in contact with its outer surface. This kiln is made with a helical rib $b'$ formed by bending the material of the kiln itself, the hollow rib thus produced increasing the area in contact with the heating gases flowing on the outside of the cylindrical shell of the kiln or drum $b$. The coal is supplied to the charging end by means of a screw conveyor $c$ and the low temperature coke produced is removed at the discharge end by a screw conveyor $d$, such coke being then disposed of in any suitable manner, as by dropping it into cars. The gases, tar, vapors and ammonia produced are removed by suction through a pipe $e$. The steam or other inert gas is admitted through a pipe $f$ projecting axially into the charging end of the kiln. The steam or other gases thus injected may also exert a heating effect in addition to performing the functions described above.

The edges of the rib $b'$ are preferably rounded so as to insure a sliding and rolling motion of the coal and to avoid any tumbling action and the resulting formation of dust.

In addition to a spiral rib as described, the rotary kiln may be provided with longitudinal ribs or partitions $b''$, as indicated in Figs. 1, 2 and 3. These partitions, together with the helical rib, form shallow cells or pockets and increase the heated surface with which the coal is in contact. The edges of the partitions $b''$ should also preferably be rounded for the same purpose as indicated in connection with the rib $b'$.

In Figs. 4 to 10 I have illustrated various other ways of combining the helical rib with longitudinal partitions. In Figs. 4 and 5, the kiln has a cylindrical wall 48 with an internal helical rib 49. Between the convolutions of which are arranged the longitudinal partitions 50. These partitions are similar to the partitions $b''$ of Figs. 1 to 3, and like them, are preferably arranged in staggered relation between adjacent turns of the helical rib. The partitions $b''$, however, have their inner edges flush with the inner edge of the helical rib $b'$ and are substantially perpendicular to the circumference of the kiln. The partitions 50, on the other hand, do not extend inwardly as far as the helical rib 49 and are disposed obliquely to the circumference of the kiln, thereby forming acute-angled pockets which will retain the coal for a greater length of time than the construction shown in Figs. 1 to 3.

In Figs. 6 and 7 the outer surface of the kiln is not cylindrical but formed with longitudinal grooves, as indicated at 51, so as to form pockets in conjunction with the interior helical rib 52, such pockets operating to increase the heating surface and also to retain the coal for a greater length of time along the upwardly rotating portion of the kiln, as indicated at 53 in Fig. 7. Some breaking up of the coal body into separate masses which then drop from the top of the kiln will occur with the construction shown in Figs. 4 and 5, but this is avoided in the case of Figs. 6 and 7, particularly if the edges of the ribs formed by the longitudinal grooving of the kiln wall are rounded.

In Figs. 8 to 10, the rotary kiln has its peripheral wall grooved so as to form an internal helical rib 54 of the same general character as described above. At four points the kiln wall is provided with longitudinal grooves or contracted portions 55 and at these points I locate two reinforcing frames 56 of the character shown in Fig. 10, and provided with wire braces 57. By this construction a reliable operation of the kiln is insured even in cases where its periphery is deformed considerably. The frames 56 not only reinforce the construction but their longitudinal members also form partitions corresponding, in function, to the partitions $b''$ of Figs. 1, 2 and 3, 50 of Figs. 4 and 5, and 51 of Figs. 6 and 7.

Figure 12 illustrates another form of internal, helical rib for the rotary kiln. The coal or other material is supplied at 78 and passes into the rotary kiln 79, the coke discharge being indicated diagrammatically at 80 and the discharge of the gases and vapors at 81. The helical rib 82 is of the same general character as described hereinabove, but is distinguished by the provision of a flange 83 at its inner edge. This flange is helical and forms part of a cylindrical surface. The purpose of providing this flange is to reduce the contact between the coal and the gases which are on their way to the outlet 81. The flange 83 will form, as it were, an apertured, central tube extending lengthwise within the kiln and the width of the opening between the free edge of the flange and the adjacent ends of the helical rib 82 may be reduced, if desired, so that the said flange 83 will form an almost continuous central tube. Methane and the heavy hydrocarbons which are particularly liable to decomposition and polymerization will thus be caused to travel chiefly through the central or axial portion of the kiln which is relatively cool and a higher output or efficiency will result. While the flange 83 has been described as forming part of a cylinder, I do not desire myself to be restricted to this particular, but said flange might be of tapering or conical shape, if preferred.

The low temperature coke produced in the operation of the rotary kilns illustrated herein consists of loose pieces of hard material which do not stick together, at least not materially. This is due to the fact that the bituminous contents of the coal which, as stated hereinbefore, have been melted by the heat, do not remain in a liquid sticky form and associated with the solid material, but are vaporized within the kiln and thus become separated from the solid material (the low temperature coke) before the latter is discharged from the kiln.

The discharge of the low temperature coke through the outlet of the kiln is effected in any suitable manner. For instance, in the construction illustrated by Fig. 1, the material might accumulate at the discharge end of the kiln drum until it reaches the level of the central tube in which the discharge screw $d$ is located, so as to be caught by the inner end of said screw. Or, as indicated in Figs. 4 and 6, the inner edge of the helical rib 50 or 52 respectively, might be nearer to the axis of the drum than the wall of the tubular outlet indicated at the right hand end of said figures, so that the material lying between the convolutions of said rib will be forced and dropped into said outlet.

In Figs. 11, 13, 14 and 15 I have illustrated special devices which may be used for the discharge of the low temperature coke from rotary kilns of the character described above. In Fig. 11 the kiln 84 has a discharge chamber 85 with a depending outlet 86 for the coke. Through a vertical sliding or telescopic tube 87 the coke drops onto a slowly rotating table 88 and forms a flaring or conical heap on it. As the table 88 rotates, a stationary scraper 89 pushes part of the coke off the edge of the table and causes it to fall into a pipe 90 provided with a valve 91 which, at that time, is open. Fig. 11 shows a duplex arrangement of pipes 90 and valves 91. The scraper 89 shown co-operates with the right-hand pipe 90. It will be understood that there is a similar scraper to co-operate with the other pipe 90, but the scrapers, while normally stationary, can be withdrawn from their active position, and in Fig. 11, it has been assumed that the left-hand scraper has been taken off and the left-hand valve 91 closed. The coke falling through the pipe 90 reaches a bin 92 closed at the bottom by a valve 93. At the upper end of each of the bins is a trough 94 adapted to contain water and to receive the edge of a cover 95 forming a hydraulic seal. In the position illustrated coke is being filled into the right-hand bin 92 and the coke previously filled into the left-hand bin 92 is undergoing cooling, the cover 95 being in position, as shown. Shortly before the right-hand bin 92 is full, the bottom valve of the left-hand bin is opened so as to allow the coke from said bin to be discharged into a suitable receptacle or car. Thereupon the position of the valves 91 is reversed, the cover 95 is shifted from the left-hand bin 92 to the right-hand bin, the left-hand, bottom valve 93 is closed and a scraper such as 89 is placed in position to sweep coke from the table 88 into the left-hand pipe 90 and into the left-hand bin 92, and thus the operation is repeated periodically. The coke bins and the entire structure transferring the coke from the outlet 86 to such bins are enclosed in a gas-tight casing 96, water-jacketed, if desired. At 97 I have indicated a gage glass in connection with the annular trough 94.

Instead of the rotary table 88 and the scraper or scrapers 89, I may employ any other suitable apparatus which permits of diverting the discharge of coke to one side or the other, for instance, reversible valves or adjustable chutes or transferring rollers.

In Fig. 13 the parts 84, 85, 86 correspond to the similarly numbered parts of Fig. 11. With the lower end of the outlet pipe 86 is connected a casing 98 containing a rotary or rocking valve 99 which controls the connection of the outlet 86 with a discharge pipe 100. The pipe 100 is provided at its lower portion with an external annular water trough 101 into which dips the upper edge of a vertically movable bell 102. The lower edge of this bell is adapted to dip into any one of several annular troughs 103 (of which there are three in the example shown), said troughs being secured to a carrier 104 mounted to rotate with a shaft 105, the axes of the troughs 103 being at the same distance from the shaft 105 and each being adapted for registry with the outlet pipe 100. The troughs 103 surround openings 106 through which the coke passing out of the pipe 100 may drop into one or the other of a plurality of coke receptacles 107 mounted on the carrier 104. These receptacles or bins 107 are provided with water-jackets and with any suitable outlet valves 108 and are adapted to discharge their contents through suitable chutes 109 into cars or upon conveying belts 110. The entire construction, from the kiln 84 to the bell 102, is gas-tight. In operation, the carrier 104 is turned until one of the bins 107 is in alignment with the outlet 100, the bell 102 being raised sufficiently to clear the path of the trough 103. Then the bell is lowered into the position shown in Fig. 14, this establishing a gas-tight joint between the outlet 100 and the interior of the bin 107 immediately thereunder. Then the valve 99 is opened and coke discharged from the kiln into such bin 107. The bin having been filled, the valve 99 is closed again and the bell 102 is lifted so as to clear the troughs 103, a sheet-metal cover is placed over the opening 106 of the bin just filled, and the carrier 104 is given a partial rotation to bring another bin 107 into registry with the outlet pipe 100 while the bin 107 previously filled is brought to a position between the filling position and the discharge position. In this intermediate position the coke is cooled. Thereupon, the second bin having been filled meanwhile in the same manner as the first, the carrier 104 is given another partial rotation which brings the third bin 107 into the filling position while the second bin 107 is brought to the intermediate cooling position and bin 107, which was filled first, now reaches a position in operative relation to the chute 109 so that the coke may be discharged therefrom by opening the valve 108.

It will be noted that there is no quenching or wetting of the coke in the constructions illustrated by Figs. 11, 13, 14 and 15, and this presents a great advantage both as to the saving of heat and as to the quality of the coke obtained.

While I have emphasized the need of not exceeding the temperature at which the gaseous hydrocarbons evolved from the coal during the treatment will be decomposed or cracked, in some cases a higher temperature might be employed so that part of these hydrocarbons would be decomposed or cracked. It is preferable, however, to so carry on the process as to preserve all of the gaseous original hydrocarbons in the condition in which they are originally evolved during the treatment.

The term "bituminous substances" or "bitumen-bearing substances" is not to be given a restricted interpretation but is to be considered broad enough to include any coal or like substances.

I claim:

1. A rotary kiln having a substantially cylindrical shell mounted to rotate on a substantially horizontal axis that is substantially parallel to the axis of said shell, said shell having a continuous internal helical rib having the consecutive convolutions thereof spaced from each other to form, with portions of said shell, a helical channel open toward the axis of the shell and toward the opposed portions of the channel, the peripheral portions of said channel being of a substantial width throughout each convolution and being constituted of a part of the wall of the shell, the side walls of the channel being constituted of the lateral faces of the helical rib, the helix having a substantially horizontal axis and being rotatable with said shell, partitions substantially parallel to the axis of said shell and extending between adjacent convolutions of said rib and radially to said axis of said shell, each of said partitions terminating at two adjacent convolutions of said helical rib and the partitions being staggered in adjacent turns of said channel, said partitions and said channel being arranged to cause such material as is fed into said channel to advance through the shell peripherally of the shell along the helical path provided by said channel when said shell is rotated; and means for heating said shell externally thereof comprising a casing surrounding said shell and spaced therefrom.

2. A rotary kiln having a substantially cylindrical shell mounted to rotate on a substantially horizontal axis that is substantially parallel to the axis of said shell, said shell having a continuous internal helical rib having the consecutive convolutions thereof spaced from each other to form, with portions of said shell, a helical channel open toward the axis of the shell and toward the opposed portions of the channel, the peripheral portions of said channel being of a substantial width throughout each convolution and being constituted of a part of the wall of the shell, the side walls of the channel being constituted of the lateral faces of the helical rib, the helix having a substantially horizontal axis and being rotatable with said shell; partitions substantially parallel to the axis of said shell and extending between adjacent convolutions of said rib and radially to said axis of said shell, the inner edges of said partitions being flush with the inner edges of said rib, said partitions and said channel being arranged to cause such material as is fed into said channel to advance through the shell peripherally of the shell along the helical path provided by said channel when said shell is rotated; and means for heating said shell externally thereof comprising a casing surrounding said shell and spaced therefrom.

3. A rotary kiln having a substantially cylindrical shell mounted to rotate on a substantially horizontal axis that is substantially parallel to the axis of said shell, said shell having a continuous internal helical rib having the consecutive convolutions thereof spaced from each other to form, with portions of said shell, a helical channel open toward the axis of the shell and toward the opposed portions of the channel, the peripheral portions of said channel being of a substantial width throughout each convolution and being constituted of a part of the wall of the shell, the side walls of the channel being constituted of the lateral faces of the helical rib, the helix having a substantially horizontal axis and being rotatable with said shell; the sides of said helical rib converging inwardly so that the width of said helical channel will increase inwardly, said channel being arranged to cause such material as is fed into said channel to advance through the shell peripherally of the shell along the helical path provided by said channel when said shell is rotated; and means for heating said shell externally thereof comprising a casing surrounding said shell and spaced therefrom.

4. A rotary kiln having a substantially cylindrical shell mounted to rotate on a substantially horizontal axis that is substantially parallel to the axis of said shell, said shell having portions bent inwardly to form a hollow continuous internal helical rib, the interior of which forms part of the outer surface of the shell, said helical rib having the consecutive convolutions thereof spaced from each other to form with portions of said shell a helical channel open toward the axis of the shell and toward the opposed portions of the channel, the peripheral portions of said channel being of a substantial width throughout each convolution and being constituted of a part of the wall of the shell, the side walls of the channel being constituted of the lateral faces of the helical rib, said rib having a substantially horizontal axis and being rotatable with said shell, the said helical channel being arranged to cause such material as is fed into the shell to advance through the shell peripherally of the shell along the helical path provided by said channel when said shell is rotated, and means for heating said shell externally thereof comprising a casing surrounding said shell and spaced therefrom.

5. A rotary kiln having a substantially cylindrical shell mounted to rotate on a substantially horizontal axis that is substantially parallel to the axis of said shell, said shell having portions bent inwardly to form within said shell a co-axial hollow continuous helical rib, the sides of which converge inwardly, the consecutive convolutions of said rib being spaced from each other to form, with portions of said shell, a helical channel of inwardly increasing width open toward the axis of the shell and toward the opposite portions of the channel, the peripheral portions of said channel being of a substantial width throughout each convolution and being constituted of a part of the wall of the shell, the side walls of the channel being constituted of those wall portions of the shell which form the inwardly converging lateral faces of the rib, the thus formed helical channel being arranged to cause such material as is fed into said shell to advance through the shell peripherally of the shell along the helical path provided by said channel when said shell is rotated, and means for heating said shell externally thereof comprising a casing surrounding said shell and spaced therefrom.

In testimony whereof I have signed this specification.

EDMUND ROSER.